United States Patent [19]
Sturman et al.

[11] 4,108,419
[45] Aug. 22, 1978

[54] PILOT OPERATED VALVE

[75] Inventors: Oded E. Sturman; Benjamin Grill, both of Northridge, Calif.

[73] Assignee: Clifton J. Burwell, Northridge, Calif.

[21] Appl. No.: 662,360

[22] Filed: Mar. 1, 1976

[51] Int. Cl.² .................... F16k 31/02; F16k 31/08
[52] U.S. Cl. ................... 251/30; 137/624.15; 239/69; 239/70; 251/46; 251/65; 251/138
[58] Field of Search ............. 137/624.11, 624.13, 137/624.15; 251/30, 43, 44, 45, 46, 65, 129, 137, 138; 239/69, 70

[56] References Cited

U.S. PATENT DOCUMENTS

| 1,986,158 | 1/1935 | Payne et al. | 251/30 |
| 2,185,394 | 1/1940 | Arbogast | 239/69 |
| 2,235,304 | 3/1941 | Toussaint | 251/45 |
| 2,573,369 | 10/1951 | Snoddy | 251/46 |
| 2,588,242 | 3/1952 | Hunter | 251/46 |
| 3,247,868 | 4/1966 | Ray | 251/30 |
| 3,306,570 | 2/1967 | Cooksley | 251/30 |
| 3,368,788 | 2/1968 | Padula | 251/65 |
| 3,460,798 | 8/1969 | Carsten | 251/30 |
| 3,578,245 | 5/1971 | Brock | 239/69 |
| 3,674,237 | 7/1972 | Heyer et al. | 251/43 |
| 3,782,630 | 1/1974 | Sabo | 239/70 |
| 3,821,967 | 7/1974 | Sturman et al. | 251/30 |
| 3,858,841 | 1/1975 | Haynes | 251/30 |
| 3,863,079 | 1/1975 | Calabrese | 239/69 |
| 3,911,955 | 10/1975 | Link | 239/70 |
| 3,921,667 | 11/1975 | Corliss et al. | 251/45 |

FOREIGN PATENT DOCUMENTS 21,960  2/1917  Denmark ................. 251/45

Primary Examiner—Martin P. Schwadron
Assistant Examiner—G. L. Walton
Attorney, Agent, or Firm—Blakely, Sokoloff, Taylor & Zafman

[57] ABSTRACT

An improved pilot operated valve which may be used in fluid control systems which may have one or more latching unit for controlling the valves. The valves utilizing a concentric arrangement of the major components thereof, each being coaxially located with respect to a single housing member. These major components include the valve closure member, the pilot valve, the diaphragm separating the high and low pressure areas, and the latching actuator controlling the pilot valve. A mounting flange member is provided for threading into a valve body, and is in turn threaded to the valve body member so that the entire valve assembly may be rotated much like a conventional valve handle to provide a flow control, and a manual shutoff if desired. The control electronics may be battery operated and may locate with respect to one valve to provide drive signals to control one or more valves in sequence. Other controls and actuators may be used.

14 Claims, 18 Drawing Figures

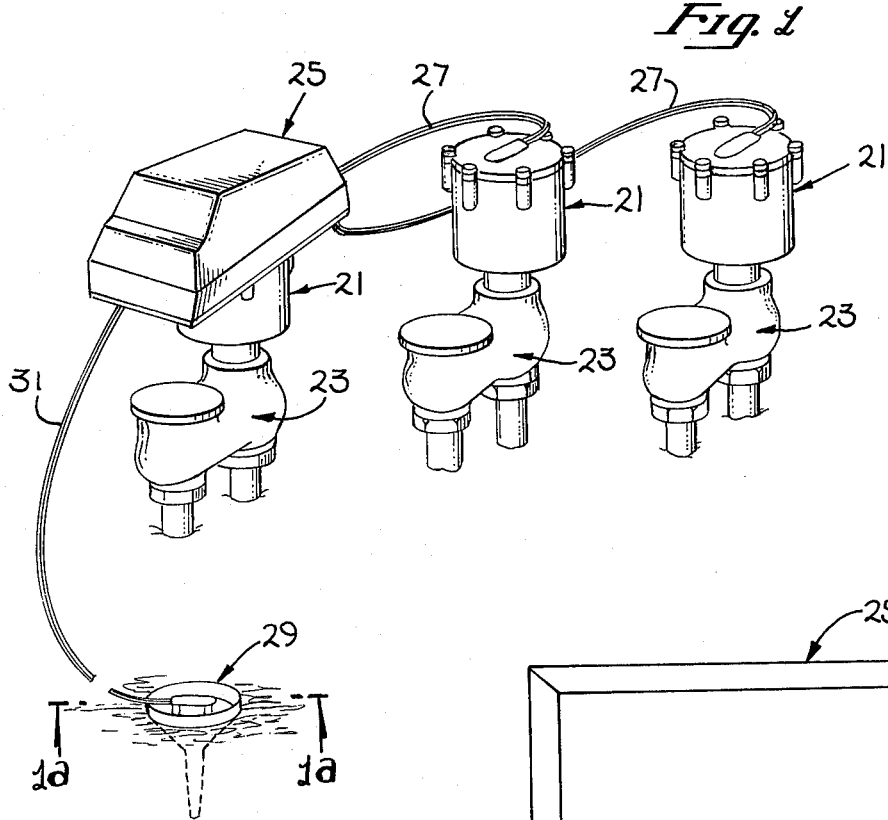
Fig. 1
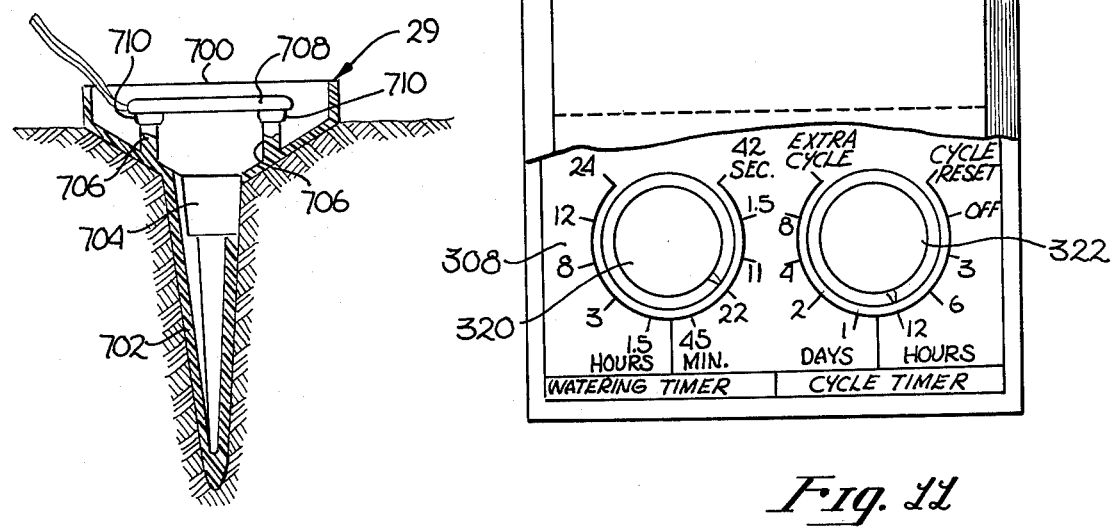
Fig. 1a
Fig. 11

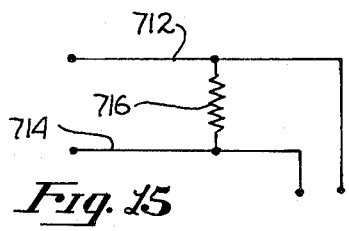
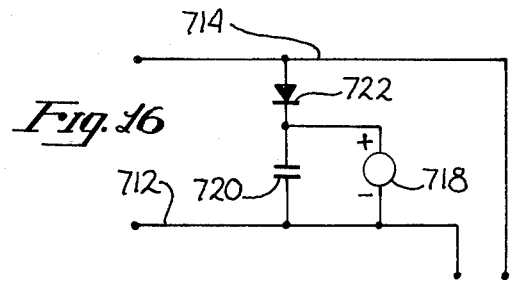
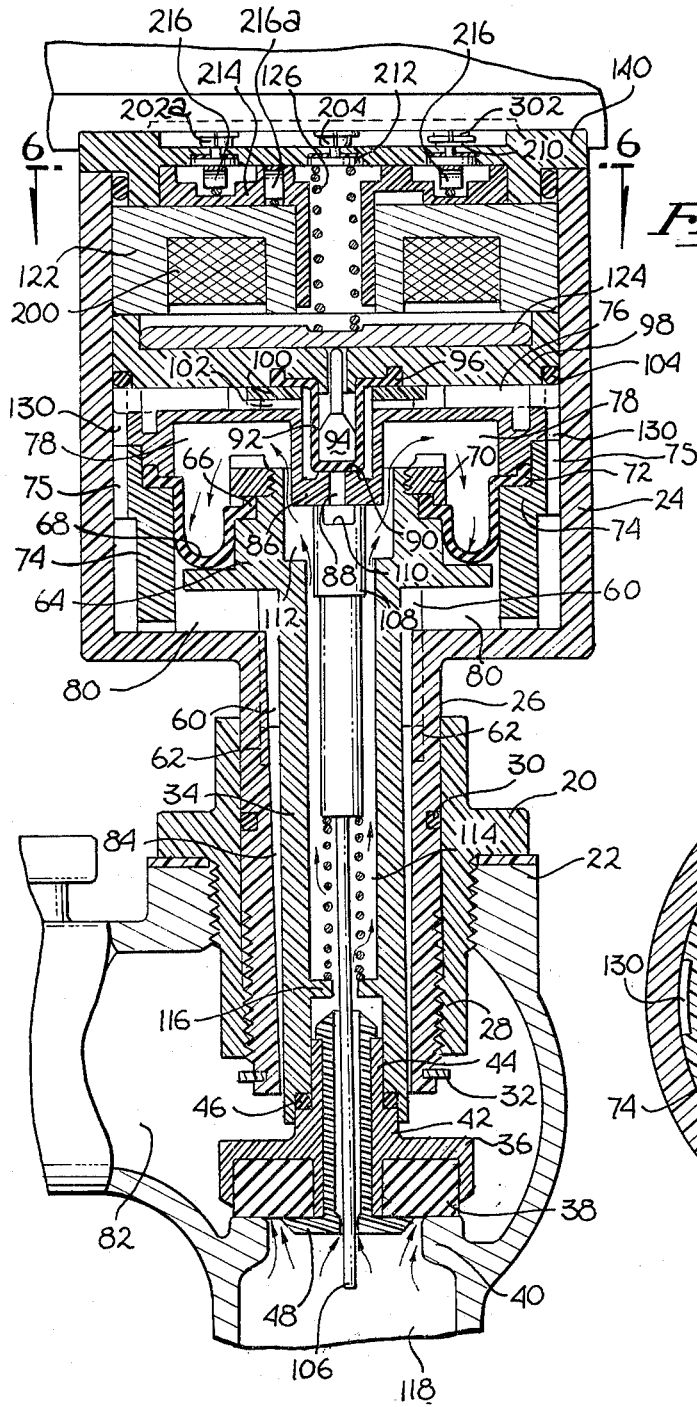
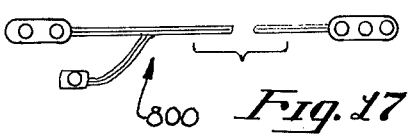
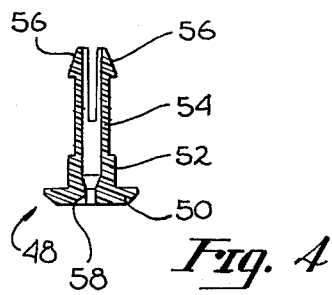
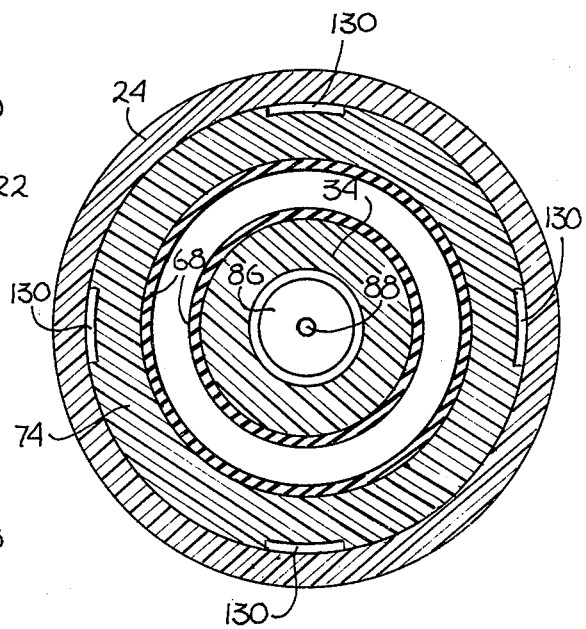

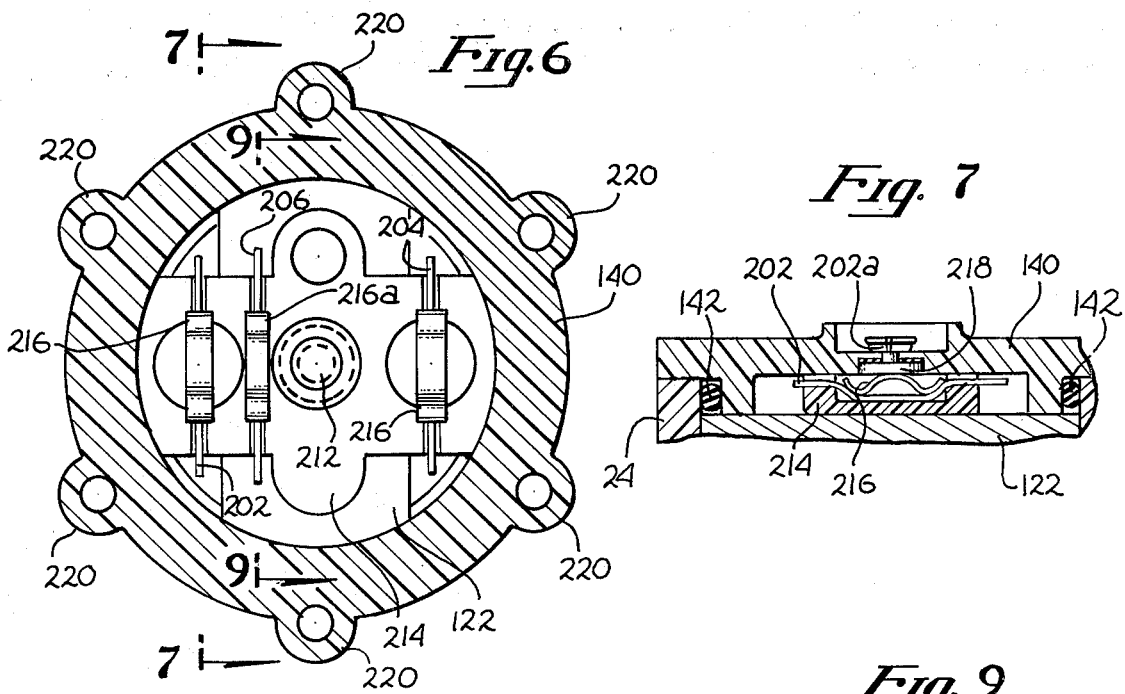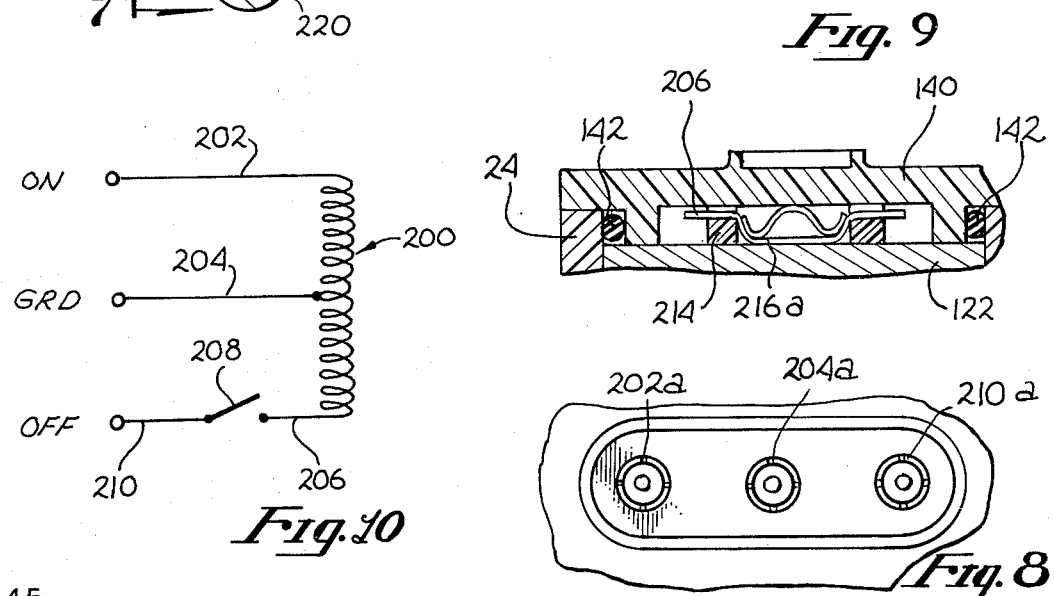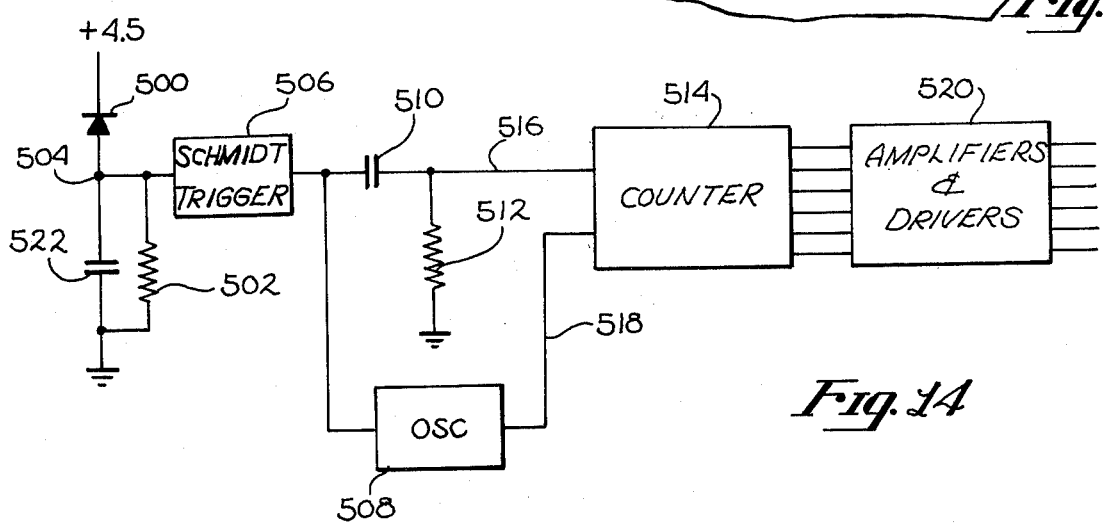

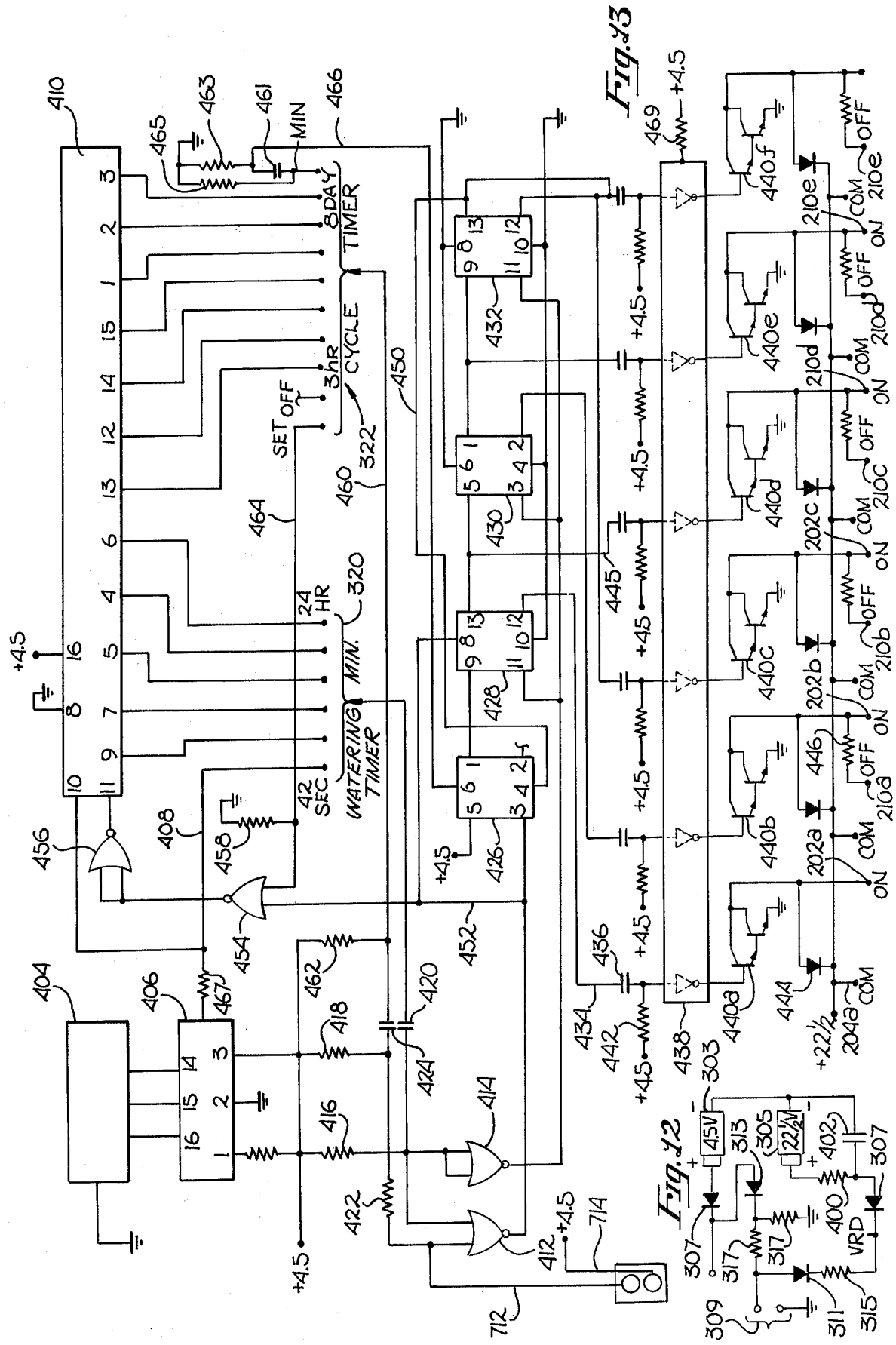

PILOT OPERATED VALVE

BACKGROUND OF THE INVENTION

1. Field of the Invention

The present invention relates to the field of fluid control systems, and more particularly to the field of automatic sprinkler systems.

2. Prior Art

The present invention is primarily directed toward use as an automatic sprinkler system and component parts thereof, and thus the following discussion of the prior art shall be so limited. In particular, the present invention comprises primarily a unique configuration for a pilot controlled valve and a unique system, including control electronics, for utilizing the valve to achieve a highly accurate, very reliable and low cost automatic sprinkler control system. Thus the prior art relating to pilot actuated valve configurations and control systems, and more particularly battery operated control systems is most relevant to the present invention.

Most prior art sprinkler valves and systems for automatic operation which are presently is use are intended for driving by a common 110 V. 60 Hz. power, typically through a mechanical time clock and step down transformer. Such systems have good reliability, and at least the component parts thereof may be manufactured at a reasonable cost. However, typically installation is very expensive for new homes, and may be prohibitive in established homes because of the necessity of running some form of electrical line under sidewalks, lawns, trees and the like. Accordingly, in recent years various designs for battery operated sprinkler control systems have been proposed which effectively eliminate these otherwise severe installation problems.

One such prior art battery operated system is that of U.S. Pat. No. 3,821,967. This type of system uses a latching actuator to control a pilot valve to actuate a main valve member cooperating with a valve seat, typically already in the sprinkler line, such as the valve seat associated with the manual valve portion of an anti-siphon valve. The latching actuator and pilot valve assembly is mounted to the side of the main actuator assembly so as to control the venting of water from the top to the bottom of the pressure responsive member (a diaphragm in the specific patent referred to). The entire system is turned on by a pulse derived from a crystal oscillator and count-down chain, with the system being turned off by a unijunction time delay circuit initiated by the turn on signal. Additional units in a group of units may only have the unijunction time delay circuit therein, with each such unit having a provision for receiving an initiating signal to trigger the opening of the valve, and to provide an initiating signal to the next valve upon its closing. This, together with the providing of an initiating signal with the closing of the valve having the crystal oscillator therein, allows for the sequential operation of an unlimited number of valves, based upon a single crystal oscillator input. Thus, each valve in such a chain comprises not only the valve but in addition at least a time delay circuit and power supply to operate the latching actuator, with the first unit in the chain also having the master time clock comprised of a crystal oscillator and count-down chain.

The foregoing system has a number of advantages. In particular, installation is very easy, the crystal oscillator is very accurate, and battery life is relatively long. In addition only one master oscillator is required for any group of valves, and yet sequential operation may readily be achieved by a simple interconnection of adjacent valves to provide sequential operation for maximum use of normally limited water supply delivery rates. Such a system, however, has certain disadvantages also. In particular the maximum watering time achievable by unijunction oscillators using components of reasonable cost is limited, and the water duration is not very accurate unless calibrated. In addition the valve mechanical configuration and the design and arrangement of the latching actuator and pilot mechanism are not of the simplest design, resulting in a larger number of parts than necessary, and having sensitivities to adjustments requiring assembly and test time. As a result, the design of the foregoing patent, while solving a great number of problems of the prior art, is now a low cost design, is limited in watering duration achievable and the accuracy of the watering duration selected.

Another type of battery operated sprinkler system is that disclosed in U.S. Pat. No. 3,547,154. That system uses a battery to operate a motor driven timer which periodically rotates a permanent magnet on a timer disc into proximity with a magnetically actuated read switch, which turns on a solenoid valve and a time delay network, which in turn turns off the solenoid valve after the desired time. This system is rather mechanically and electronically complex and requires relatively large batteries, such as wet storage cells. It further has no provision for operating a plurality of valves in sequence from a single timer. While various specific valve configurations are known for use in such systems (see U.S. Pat. Nos. 3,460,798; 3,785,612; 3,858,841; 3,412,970; 3,410,301; and 3,363,433) such valves are mechanically complex and consume too much power for battery operation. Thus there is a need for valves for fluid control system which are mechanically simple and inexpensive to manufacture, and which consume a minimum of power so as to be suitable for battery operation.

BRIEF SUMMARY OF THE INVENTION

An improved pilot operated valve which may be used in a fluid control system which may have one or more latching solenoid operated pilot control valves and a master control unit for controlling the valves. The valves utilize a concentric arrangement of the major components thereof, each being coaxially located with respect to a single housing member. These major components include the valve closure member, the pilot valve, the diaphragm separating the high and low pressure areas, and the latching actuator controlling the pilot valve. A mounting flange member is provided for threading into a valve body, and is in turn threaded to the valve body member so that the entire valve assembly may be rotated much like a conventional valve handle to provide a flow control, and a manual shutoff if desired. The control electronics may be battery operated and may locate with respect to one valve to provide drive signals to control one or more valves in sequence. The control electronics utilizes an oscillator such as a crystal oscillator with a chain of count down flip-flops to provide binary signals up to a period of preferably 24 hours or more. A manual selection is provided to select among the longer period signals to control the frequency with which the operating cycle is initiated, with a second manual control being used to select one of the lower frequency signals to control the duration for which each valve will remain open. Logic is provided so that only one valve will be open at any one time thereby providing for sequential rather than simultaneous operation of a group of valves during each watering cycle. Alternate embodiments utilizing light sensitive controls are also disclosed.

BRIEF DESCRIPTION OF THE DRAWINGS

FIG. 1 is a perspective view of a system utilizing the present invention valves and controller, complete with moisture probe;

FIG. 1a is a cross-section of the moisture probe of FIG. 1;

FIG. 2 is a partial cross-section of a typical valve of the system of FIG. 1 illustrating the valve in the closed condition;

FIG. 4 is a cross-sectional view of member 48 of FIGS. 2 and 3;

FIG. 5 is a cross-section taken along the line 5—5 of FIG. 3;

FIG. 6 is a cross-section taken along line 6—6 of FIG. 2;

FIG. 7 is a partial cross-section taken along line 7—7 of FIG. 6;

FIG. 8 is a top view of a portion of the top cap of a typical valve;

FIG. 9 is a partial cross-section taken along line 9—9 of FIG. 6;

FIG. 10 is a schematic diagram illustrating the wiring of the solenoid in the preferred embodiment;

FIG. 11 is a top view, partially cut away, of the electronic controller of FIG. 1;

FIG. 12 is a circuit diagram of the battery power supply for the electronic circuit;

FIG. 13 is a schematic for the electronic circuit of the controller of FIG. 1;

FIG. 14 is a schematic for an alternate controller;

FIG. 15 is a schematic for a circuit for disabling the controller during daylight hours;

FIG. 16 is a circuit for disabling the controller during hours of darkness; and

FIG. 17 illustrates a split connector for providing overlapping or staggered operation of the valves.

DETAILED DESCRIPTION OF THE INVENTION

Figure 3:
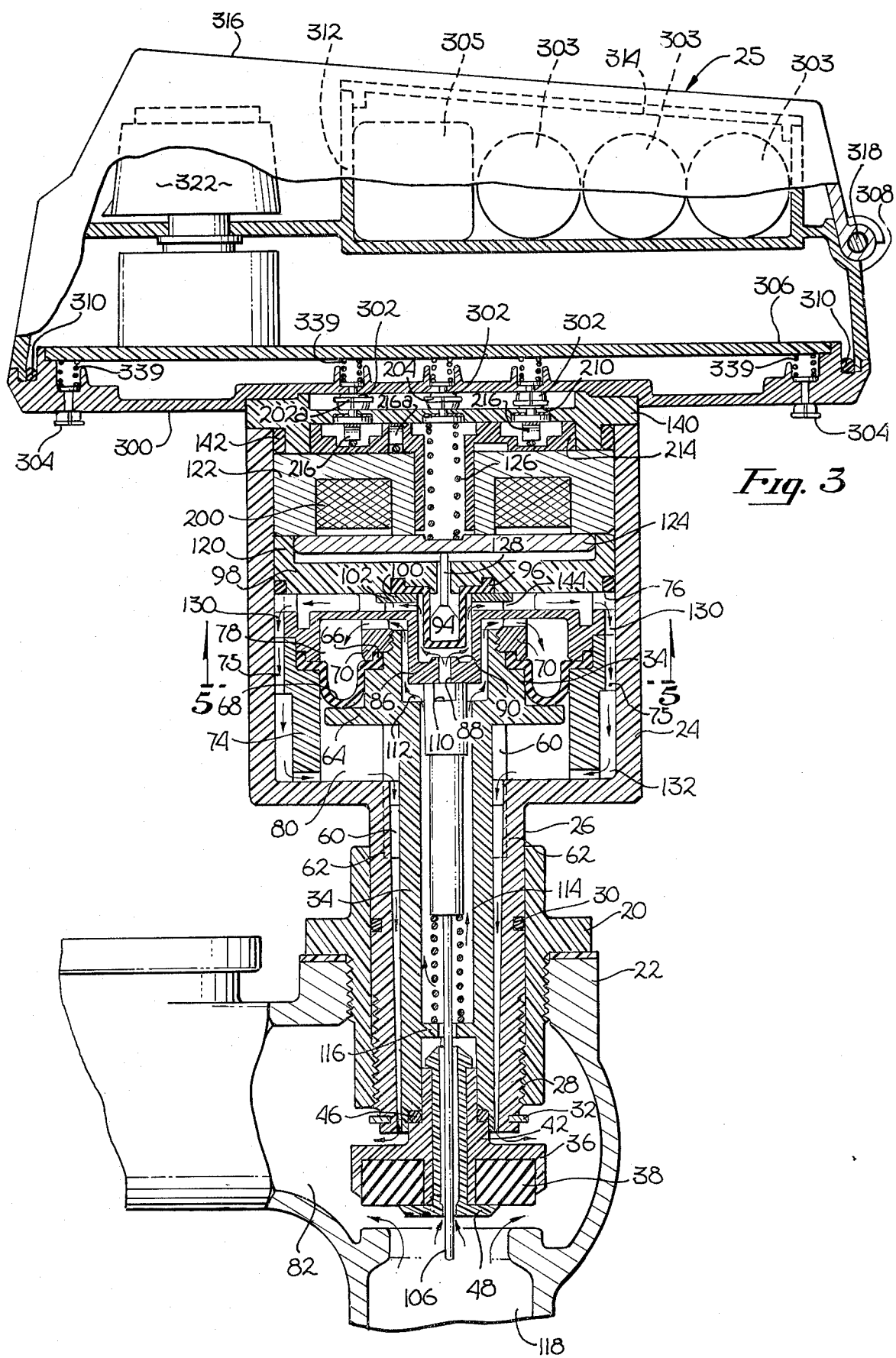
FIG. 3 is a partial cross-section of a valve and electronic controller illustrating the valve in the open position.

First referring to FIG. 1, a perspective view of a typical installation utilizing three valves operated from a common battery operated controller may be seen. The valves 21 replace the manual valve portion of antisiphon valves 23. One of the valves, namely the left valve, has a control package mounted thereon. The control package 25, which is battery operated, operates not only the valve on which it is mounted, but further is coupled through leads 27 to the other two valves in the system illustrated so as to operate all three valves in sequence. The valves themselves however are identical, and in that regard the control package 25 may be mounted on any of the valves, and the valves may be operated in any sequence desired. Also shown in FIG. 1 is a moisture sensor 29 coupled to the controller 25 through a line 31.

Now referring to FIG. 2, a partial cross-section of the basic valve assembly of the present invention may be seen. This embodiment of the valve assembly is intended to replace the manually operated valve on conventional valve bodies, and may also be used in conjunction with conventional anti-siphon valves commonly used in sprinkler systems as a replacement to the manually operated valve portion thereof. Thus, a mounting member 20 is provided with the valve assembly for threading into a valve body, such as the anti-siphon valve body 22. A housing 24 containing the mechanism of the pilot-operated valve has a downward extending smaller diameter portion 26, which at the lower end thereof mates with threads 28 in the mounting member 20. An O ring 30, located in a cooperatively disposed groove in the downward extending portion 26, provides the desired sealing between member 26 and the mounting member 20.

One of the features of the present invention may be noted in the structure so far described. In particular, it will be noted that the lower portion 26 of the housing 24 threads into mounting member 20 without any fixed limit or locating shoulder, and accordingly, the housing 24 and the entire assembly therein may be rotated to screw the assembly further into or out of the mounting member 20. This allows one to manually close the valve, and provides an adjustable flow control for the valve when in the open position. A snap-ring 32 locates in a cooperatively disposed snap-ring groove adjacent to the bottom of member 26, below the bottom of the mounting member 20, so as to prevent the inadvertent unscrewing of the valve assembly from the mounting member.

A valve actuating member 34 extends downward through the lower portion 26 of the housing 24 to support a valve closure assembly comprising support member 36 and a compliant rubber washer 38, which in conjunction with the seat 40 on the valve portion of the anti-siphon valve duplicates the function of the manual valve normally supplied with the anti-siphon valve assembly. The support member 36 has an upward extending section 42 extending within the end of the valve actuating member 34, with a smaller further upward extending section 44 sliding within a mating internal diameter of the actuating member. An O-ring 46 is disposed in the groove defined by the combination of the support member 42 and the valve actuating member 34, which provides a fluid seal between these two members and further serves the additional functions of frictional retention of the two members (the support member and the valve actuating member) in cooperative relationship and of providing some slight swivel effect between these two members so as to allow the rubber washer 38 to align and fit flat on the valve seat 40 as shown in FIG. 2 to assure positive valve closure.

Washer 38 is retained in position with respect to the support member 36 by a flanged member 48, details of which may be seen in FIG. 4. This member has a lower flange 50 and upward extending cylindrical section 52 for slidably fitting within a mating inner diameter on the support member 44, and a further upward extending section 54 defining first and second opposed spring-like members 56 at the upper end thereof. Member 48 also has a concentric opening therethrough defined in part by a smallest diameter 58 at the lower end thereof. The flanged member 48 slides through the inner diameter of the support member 36 with the upward extending spring-like member 56 snapping outward over the upper end of the support member to retain the support member, the rubber washer and the flanged member in assembled disposition. Thus, it will be noted that this entire assembly may be readily removed from the lower end of the valve actuating member 34 by merely pulling it off against the frictional restraint of the O-ring 46. This allows the quick replacement of the assembly with a different assembly to fit valves of other sizes or dimensional characteristics, and further allows the quick replacement of the rubber washer 38 if such replacement is ever required. It will be noted that all such replacement may be accomplished, once the valve assembly is off the valve body, without any tools such as screwdrivers and the like, thereby minimizng the possibility of damage to any of the plastic parts of the valve.

Adjacent the upper portion of the valve actuating member 34 are four equally spaced key-like projections 60 around the periphery of the valve actuating member (only two being visible in FIG. 2). These key-like members slidably engage cooperatively disposed slots or reliefs 62 in the inner surface of the downward extending portion 26 of the housing 24, so as to freely allow relative axial motion while preventing relative rotation therebetween. At the upper end of the valve actuating member 34 is a flange-like protrusion 64 having a provision for receiving the inner diameter 66 of a rubber diaphragm 68, with a lock-nut 70 threadably engaging the upper end of the valve actuating member to lock the inner surface of the diaphragm in this assembly. The outer periphery of the diaphragm 72 is retained between a support member 74 and a pilot valve member 76. The pilot valve member 76 in conjunction with the diaphragm 68 defines an upper chamber 78 which, when pressurized, will tend to encourage the valve actuating member to the lower position. A lower chamber 80 below the diaphragm is in communication with the low pressure side of the anti-siphon valve 82 through the annular region 84 between the valve actuating member 34 and the lower portion 26 of the housing 24.

The pilot valve member 76 has a central downward protruding portion 86 having an opening 88 therethrough, with a valve seat 90 at the top of the opening 88. A rubber diaphragm 92 may be encouraged to the downward position by a pilot valve actuating member 94 so as to abut the valve seat 90 and close off the opening 88. The upper portion of the diaphragm 92 has a radially outward extending flange terminating with an O-ring-like periphery 96 sealing within a cooperatively disposed groove in a separator member 98. A pressure plate 100 is supported on a plurality of legs 102 so as to force the O-ring-like periphery 96 of the diaphragm 92 into good sealing abutment with the separator plate 98 while at the same time allowing water flow thereunder in a manner which will be subsequently described. The separator plate in turn is sealed against water leakage around its periphery by an O-ring 104 disposed between the separator member and the housing 24. Below the downward extending protrusion 86 of the pilot valve member is a rod 106 having an enlarged end 108 abutting the lower surface of protrusion 86 and having a transverse slot 110 at the upper end thereof so as to allow fluid communication between the opening 88 and the region 112. The rod 108 is encouraged upward to the position shown by the coil spring 114 which in turn is retained against downward motion by the inward projecting shoulder 116 adjacent to the lower end of the valve actuating member 34. Accordingly, the coil spring 114 also encourages the valve actuating member to the lower position with a force sufficient to override any contrary elastic encouragement of the valve actuating member by the diaphragm 68, though totally insufficient to itself hold the valve in the closed position (valve actuating member down) against any significant pressure in the high pressure side of the valve 118.

With the pilot valve closed, that is, diaphragm 92 resting on valve seat 90 on the pilot valve member 76, the low pressure chamber region 80 is vented to the low pressure or downstream side 82 of the valve. The upper or high pressure chamber 78, on the other hand, is in communication with the high-pressure or inlet side of the valve 118 through the annular flow regions immediately surrounding pin 108 and the downward protrusion 86 of the pilot valve member 76. Consequently, as the valve closure member moves downward against the pressure in the inlet line 118, this same high pressure of the inlet line is communicated to chamber 78 above the diaphragm and, since the diaphragm and associated moving structure has an area exceeding the area enclosed by the valve seat 40, the actuating member will move downward to the position shown in FIG. 2 against the inlet pressure in line 118 to close the valve and retain the valve in the closed position. (Initially, when the valve is open, the pressures in regions 82 and 118 may be nearly equal in which case the pressures above and below the diaphragm will also be nearly equal. In this case, the coil spring 114 will initially encourage the valve actuating member and associated assembly downward to start the closing sequence, with the differential pressures generated during closing taking over to complete the closing regardless of any reasonable pressure in line 118).

Now referring to FIG. 3, the valve may be seen in the open position. The separator member 98 has an integral outward-extending periphery 120 abutted from above by the core 122 of a solenoid actuator, with the core 122 and separation member 98 defining a region therebetween for containing the moving member 124 of the actuator. The moving member 124 is normally encouraged to the lowermost or downward position by a coil spring 126, which in turn pushes the member 94 to the lower position by a drive pin 128 projecting through a cooperating hole in the separator member 98. This forces the diaphragm 92 against the valve seat 90, closing the pilot valve as shown in FIG. 2. However, when the actuator is actuated as shown in FIG. 3, the pilot valve is opened and, as shall be subsequently described, the region above the diaphragm is effectively vented to the region below the diaphragm, thereby equalizing the pressures and allowing the pressure in the inlet line 118 to force the valve actuating member to the open position. Thus, with the pilot valve open, the fluid above the diaphragm may flow over the top of members 70 and 34, and between legs at the top of these two members provided for this purpose. This flow path continues between the inner diameter of the valve actuating member 34 and the outer diameter of the downward protrusion 86 on the pilot valve member, through the slot 110 and the pilot valve, and upward around the diaphragm 92, between the legs 102 on member 100, outward through enlarged slots in the top of member 76, through an annular region 130, slots 75 provided for this purpose, through an annular region 132 and finally between legs at the bottom of member 74 provided for this purpose. This flow path is made particularly nonrestrictive in comparison to the restriction provided by the annular flow region between rod 106 and member 48 so that the pressures on the two sides of the diaphragm can nearly equalize, independent of the pressure differential between the inlet line 118 and the outlet region 82 on the valve body. Accordingly, this differential pressure is resisted only by the force of coil spring 114, a relatively minor force, so that the valve is forced to the open position by the pressure in the inlet region 118 to allow flow therethrough.

It will be noted that in the previous description, all the various components of the valve assembly, including the valve actuating member and associate components, the pilot valve and the actuator, are substantially coaxially arranged. In addition, it may be noted that the only subassembly which is separately retained is that of the valve actuating member 34, diaphragm 68 and retaining nut 70, with all of the additional various parts hereto described which are located within the housing 24 being merely a stacked assembly ultimately retained under a compressive force resulting from the fastening of the top cap 140 onto the housing 24, which in the preferred embodiment is achieved through the use of self-tapping screws. The "wet" portion of the assembly, that is, the lower housing assembly, is sealed with respect to the actuator by the O-ring 104 and diaphragm 96 (FIG. 2) with the actuator region in turn being sealed from the external environment in party by the O-ring 142.

It should be noted also that the angular orientation of the various parts, except for the valve actuating member 34 with respect to the downward extending portion 26 of the housing 24, is not restricted. In particular, where the flow passageways in some parts must be in communication with similar flow passageways in adjacent parts, annular reliefs are generally provided in one of the parts between the passageways so that peripheral fluid flow in the annular relief will compensate for the random angular orientation of the parts. By way of specific example, the annular region 130 between pilot member 76 and the housing 24 (FIG. 2), assures proper flow between the passages defined in part by the pilot valve member 76 and the support member 74. (A similar annular passage 144 is provided between member 100 and the pilot valve member 76.)

Now referring to FIGS. 2, 6 and 7, details of the actuator, and particularly the electrical connection thereof may be seen. The actuator of the preferred embodiment is basically that of U.S. Pat. No. 3,743,898, and more specifically an actuator comprising one-half of the dual actuator of FIG. 8 of that patent. This type of actuator is characterized by a stationary magnetic member 122, a moving magnetic member 124 and a magnetizing coil or coils 200. By maintaining the air gap at substantially zero when in the actuated position, very little MMF is required to maintain the actuator in that position, and a self-latching effect is attained even with magnetic members of low retentivity. When the field strength is reduced as the result of a demagnetizing current in coil 200, the force between the moving member 124 and the stationary member 122 falls in proportion to the square of the flux density, so that the return spring 126 may force the moving member 124 to the downward position, thereby closing the pilot valve as shown in FIG. 2.

Now referring to FIG. 10, a schematic illustration of the electrical connection of the solenoid coil 200 in each valve may be seen. The coil consists of two sections separated by a tap 204, with end leads 202 and 206. Line 204 in the ultimate interconnection represents a common line, with a pulse on line 202 providing magnetization of the magnetic circuit in a first direction to actuate the solenoid and latch it in the closed position. A pulse of lesser current magnitude between line 206 and the common of the same polarity causes a magnetizing field in the opposite direction, and if properly limited results in substantial demagnetization of the magnetic path, thereby allowing the return spring 126 to force the actuator to the lower or extended position to close the pilot valve. A switch 208 is shown in FIG. 10, disposed between the off input lead 210 and the lead 206 of the coil which switch in practice is provided by the mechanical and electrical contact between the moving member 124 and the stationary member 122 when in the closed position, and the absence of such contact when in the open position, as shown in FIG. 2. Thus lines 202 and 204 are wired directly to two of the electrical connections 202a and 204a on the valve (see FIG. 8), with the third connection 210a being coupled to lead 206 on the coil 200 through a center contact 212, coil spring 126, moving member 124 and finally stationary member 122.

In the preferred embodiment the stationary member 122 is not a full circular member, but instead the sides are truncated symmetrically so that a portion of the coil 200 extends beyond the sides of the member, allowing the various leads thereof to freely pass upward between a plastic member 214 and the top cap 140. Member 214 has three slots across the top surface thereof (FIGS. 6 and 7) to receive and locate the three wires 202, 204 and 206 from the solenoid coil. For two of the leads, specifically leads 202 and 204, member 214 contains pockets in the central section of the slot for receiving the leads in which a metal spring member 216 is located. These metal spring members each encourage the respective lead down, forcing the spring member into direct face to face abutment with a contract pad 218 riveted through an appropriate opening in the top cap 140 and to an electrical terminal of some form on the top of the top cap. In the preferred embodiment the contacts or terminals 202a and 204a (FIG. 8) are male and female terminals respectively of the type commonly used on the conventional nine volt transistor batteries so as to provide a quick disconnect capability with a mating connector.

For the third lead 206 a slightly different arrangement is used, as may be seen in FIG. 9. In particular, the pocket containing the spring clip 216a extends all the way through the member 214 so that the spring clip 216a forces the lead 206 into electrical contact with the stationary member 122 of the actuator. Also the lead 206 is forced into good face to face abutment with the spring clip by the plastic top cap 140, so that all electrical connections are made within the valve without requiring soldering. The integrity of the seal of the enclosure is maintained by the use of rubber washers 218 (FIG. 7) which seal each of the terminal openings. The top cap itself is held on by a plurality of flat head self-tapping screws extending through the cover and into holes provided in regions 220 of the valve housing 24 (FIG. 6).

Now referring again to FIG. 3, some of the details of the control package may be seen. The control package has a bottom mounting plate 300 having three contacts 302 riveted through the base plate 300 and having a combination of male and female connections so as to snap onto terminals 202, 204 and 210 of any of the valves, though only with the proper connections. The base plate 300, a substantially rectangular plate as may be seen from FIG. 11, extends beyond the edges of the top plate 140 on the valve and has thereunder an additional plurality of terminals 304 of the same general type for coupling to additional valves through appropriate cables, as may be seen from FIG. 1. In the preferred embodiment the riveting of the various terminals 302 and 304 in position through the base plate provides internal contacts for coil springs 339 coupling the contacts to the circuit board. The circuit board itself is held down by cover 308 at locations not showing in the cross-section of FIG. 3, with screws in the corner regions and outside the periphery of O-ring 310 holding cover 308 to the base plate 300.

The printed circuit board 306 supports a pair of rotary switches, one of which may be seen in the Figure. A cover 308 encloses the circuit board and circuit thereon sealing about its periphery with the base plate 300 by way of O-ring 310. The cover 308 in addition includes an integral receptacle 312 for batteries covered by member 314, with a protective cap 316, covering the switches and batteries, having a hinge 318 to allow the lifting of the cap to obtain access to the switches and batteries. A top view of the cover 308 may be seen in FIG. 11; its main appearance characteristic being that of the two rotary switches 320 and 322. In particular, rotary switch 320 is used to select the watering time (the length of the time each valve will remain open). Thus in the preferred embodiment a minimum duration of approximately 42 seconds is available, with increasing durations of approximately one and one-half, eleven, twenty-two and 45 minutes, and one and one-half, three, six, twelve and twenty-four hours being attainable through the switch 320. (As will be subsequently seen, however, other lines are also possible.)

The rotary switch 322 is used to select the watering period or frequency. In the preferred embodiment the selections are provided between three hours and eight days, in increments separated by factors of two. In addition, there are provided certain additional positions, including an off position which disconnects the clock from the driver electronics, a cycle reset position which resets the clock to zero, and an extra cycle position which will cause an extra watering cycle.

The circuit of the preferred embodiment may be seen in FIGS. 12 and 13, with FIG. 12 providing the circuit for the battery power supply and FIG. 13 providing a circuit for a five station controller; that is, a controller which will operate up to five valves of the present invention automatically and in sequence.

The supply of FIG. 12 includes four batteries, three 1½ volt pen light batteries 303 (see FIG. 3) providing 4½ volts for operating the oscillator and other parts of the control electronics, and a 22½ volt battery 305 for providing the main drive power for operating the actuator. In order to be able to provide a high current pulse to each actuator when required, while still protecting the battery, the 22½ volt battery is connected to an RC network comprised of resistor 400 and capacitor 402. In this manner the resistor 400 limits the current drawn from the battery, whereas the capacitor 402 stores sufficient charge to deliver a current pulse at VRD of a substantial fraction of an amp for the required ten to twenty milliseconds. Also, it will be noted that diodes 307 are provided to protect the batteries against reverse flow. Thus, an external supply may be connected to terminals 309 as a substitute power source, or as a primary source with or without the batteries as a backup supply. The external source and batteries are isolated from each other by diodes 311 and 313, with resistor 315 being a current limiter, and resistors 317 acting as a limiter and voltage divider for the lower voltage supply VLD.

The circuit of FIG. 13 may be functionally described as follows: A crystal oscillator provides a reference frequency which is count-down through flip/flop chains to provide a selection of pulses, ranging from approximately 42 seconds to 24 hours for the watering timer, and a further longer period series of pulses ranging from three hours to eight days for the cycle timer. The cycle timer pulse is used to initiate a form of counter, which then is advanced through its count in steps determined by the watering timer pulses, after which it locks up awaiting the next cycle timer pulse (or a pulse received by rotating the cycle timer 322 [FIG. 11] to the extra cycle position). As this last counter steps through its count the outputs thereof are passed through RC networks to provide pulses of controlled duration to pulse on Darlington drivers to provide six pulses, starting at the time determined by the cycle timer, and having a time duration between pulses determined by the watering timer selection. The first pulse is used to turn on the first valve, with successive pulse turning on the next valve and turning off the previous valve, until the final stage turns off the last valve in the sequential chain.

To accomplish the foregoing a crystal oscillator is provided comprising the crystal and associated network 404, and a crystal driver 406. In the preferred embodiment an RCA COS/MOS crystal driver identified by their part number CD 4045 is used, with the crystal network being selected in accordance with the manufacturer's recommendations as is well known in the prior art. The crystal frequency is selected so that the crystal driver 406, which includes a twenty-one stage count-down chain, provides an output pulse rate of one pulse per forty two seconds on line 408. This pulse is used as the forty two second water timer pulse and in addition is provided to the input of an additional fourteen stage count-down chain 410, which in the preferred embodiment is an RCA binary counter identified by their part number CD 4020. This provides additional longer period output pulses, with the pulses to twenty four hours being used for the additional watering timer outputs or selections, and with the pulses ranging from three hours to eight days being used for the cycle timer. A pair of NOR gates 412 and 414 have their inputs biased positively or to the high state by resistors 416 and 418. In the preferred embodiments these NOR gates are RCA's part number 4001, with the two inputs to the gate 414 being tied together so as to operate as an inverter. It will be noted that the output of the watering timer selection switch 320 (see also FIG. 11) is coupled through a capacitor 420 to one input of the NOR gate 412 as well as to the input of NOR gate 414. The output of the cycle timer selector switch 322 on the other hand is coupled through a coupling capacitor 424 and a resistor 422 to the second input of NOR gate 412. Since resistors 416, 418 and 462 (high value resistors) normally encourage the input to the NOR gates 412 and 414 to the high state, a positive going pulse on the outputs of either the watering timer or the cycle timer will only encourage these inputs to a still higher state, whereas the negative going transition of the outputs of the watering timer and cycle timer will drive the inputs to the low state. Accordingly, the outputs for the NOR gates 412 and 414 are normally in the low state. However, upon occurrence of a negative going transition from the watering timer, the output of NOR gate 414 will be pulsed to the high state with a pulse width determined by the time constant of capacitor 420 and resistor 416, and upon the simultaneous negative transition of both the watering timer output and the cycle timer output, the output of NOR gate 412 will also be pulsed positive, again with the pulse width dependent upon the time constants of the input signal conditioning RC network.

The output of the NOR gates 412 and 414 are applied to a series of flip/flops 426, 428, 430 and 432. In the preferred embodiment these flip/flops are comprised of a pair of RCA dual D-type flip/flops designated by their part no. CD 4013 (the numerical designations within the boxes representing the flip/flops,. as well as in the count down chain 410 and a crystal driver and count down chain 406, represent the manufacturer's pin designations for the specific part numbers identified herein as being used in the preferred embodiment). The data input line on the first flip/flop 426 is coupled to the positive terminal of the 4½ volt power supply, and therefore the Q output from terminal 1 of flip/flop 426 will go to the high state upon a pulse on terminal 3 (the output of NOR gate 412). This acts as the initial enabling pulse, as the output of NOR gate 412 is pulsed only once each time the cycle timer provides an output pulse (for reference in the description to follow, terminals 5 and 9 are the data terminals; terminals 6 and 8 are the set terminals; terminals 4 and 12 are the reset terminals; terminals 3 and 11 are the clock input terminals; terminals 1 and 13 are the Q output terminals and terminals 2 and 10 are the Q terminals).

For purposes of explanation, assume that every two days each sprinkler valve is to be turned on for 3/4 of an hour. Accordingly the watering timer adjustment 320 will be set for forty five minutes and the cycle timer will be set on two days. With these settings, the output of NOR gate 414 will pulse positive every forty five minutes, and once every two days the output of NOR gate 412 will also pulse positive. Initially, all the flip/flops are the low state (Q low, Q high). The output of NOR gate 412 is coupled to the clock input of flip/flop 426 and the set input of flip/flop 428. Since the data input to NOR gate 426 is coupled to the 4.5 volt supply, once every two days the Q output of flip/flop 426 is clocked to the high state and the Q output of flip/flop 428 is set to the high state. This change in the Q output of flip/flop 428 is coupled to the data input of flip/flop 430, and the Q output of flip/flop 428 is coupled through line 434 and capacitor 436 to one of the amplifiers 438. Since the Q output of flip/flop 428 changes from the high state to the low state, a negative going pulse is coupled to amplifier 438. The resistor 442 in conjunction with the coupling capacitor 436 provides an RC time constant for this pulse so that the input to the amplifier is a negative going pulse of limited width, in the preferred embodiment a pulse of approximately 20 milliseconds. The amplifiers 438 are actually inverting amplifiers, and more particularly in the preferred embodiment comprise an RCA hex buffer/convertor having their part number CD 4049. Thus, the negative going pulse on the input to the amplifiers 438 provides a positive going pulse output for driving the base of the Darlington pair 440a, thereby coupling terminal 202a to ground for a period of approximately 20 milliseconds (see also FIG. 5 for the identification of the actuator leads 202, 204 and 210, which designation is continued with respect to FIG. 12, though with a letter suffix to distinguish between a plurality of valve drivers and valves). Since terminal 204a (the common terminal) is coupled to the positive terminal of the 22½ volt supply, the full voltage on capacitor 402 is momentarily applied to the actuator coil, thereby drawing the moving member into close face to face abutment with the stationary member and magnetizing the magnetic circuit so that the retentivity, though reasonably low, holds the moving member in the actuated position. (Diode 444 protects the Darlington pair from an otherwise high back EMF of the actuator when the Darlington switch is turned off at the end of the pulse.)

At the same time the Q output of flip/flop 428 is coupled through line 445 and associated circuitry to the fourth amplifier 438, and since it is inverted therein, provides a negative going pulse to the base of Darlington pair 440d. Because of the negative going pulse however, the Darlington pair is not turned on, and accordingly only the first driver (Darlington pair 440a) is pulsed on.

After forty five minutes another pulse is received from NOR gate 414 which clocks the flip/flop 430 to the set position. Since the negative going Q output of this flip/flop is inverted by the amplifiers 438 and coupled to the base of Darlington pair 440b, a pulse is received to turn on the second valve through terminal 202b. Also a current limiting resistor 446 is coupled to this terminal to provide a current limited output on terminal 210a, which turns off the first valve. After still another forty five minutes flip/flop 432 will trigger Darlington pair 440c in substantially the same manner to provide a turn on pulse for the third valve on terminal 202c and a turn off pulse for the second valve on terminal 210b. In addition, the positive going transition of the Q output of the flip/flop 432 is coupled back to the reset terminal 4 of flip/flop 426, thereby resetting the flip/flop to change the Q output to the low state. Accordingly, in the following three forty five minute intervals, flip/flops 428, 430 and 432 are successively clocked to the reset condition, with the negative going Q output pulses thereof being used to trigger the Darlington pairs 440d, 440e and 440f, respectively. All flip/flops now are in the same state as initially, awaiting the next pulse output from NOR gate 412 to start the sequence over again.

Aside from initiating the sequential operation hereabove described, an output from NOR gate 412 is also coupled back through line 452 and through NOR gates 454 and 456 to reset the count down chain 410. As in the example previously given, every two days a pulse is received from the output of NOR gate 412 to initiate the watering sequence and reset the countdown chain to start counting for the next two day cycle. It will be noted that the second input to NOR gate 454 is biased to the low state by a resistor 458 so that with respect to a pulse on line 452, both NOR gates 454 and 456 act as invertors, thereby providing the positive going reset pulse to flip/flop chain 410 upon the appearance of a positive going pulse output of NOR gate 412. A similar clock reset pulse however, may be derived by rotating the cycle timer 322 to the cycle reset position. Since line 460 is biased to the high stated by resistor 462, which is a lower resistance than resistor 458, the second input to NOR gate on 454 on line 464 is driven to the high state, thereby resetting flip/flop chain 410. Accordingly, the clock is set by rotating the cycle timer 322 to the cycle reset position at the time one of the watering cycles is desired. By way of specific example, if it is desired for the watering sequence to be initiated at 7:00 A.M. every other day, the cycle timer is momentarily rotated to the cycle reset position at 7:00 A.M., and then turned to the two-day position, whereupon the desired watering sequence will occur every other day at 7:00 A.M. Also, of course, any number of valves up to five may be used with the circuit of FIG. 13, as the proper operation of the circuit does not depend upon valves actually being coupled to all outputs of the circuit. Finally, it will be noted that an extra cycle position is provided for the cycle timer 322. When the cycle timer is rotated to this position the high state on line 460 is coupled to capacitor 461, which in combination with resistors 463 and 465 provides a pulse on line 466 is set flip/flop 426. Thus, on subsequent pulses from NOR gate 414, the flip/flops 428, 430 and 432 will be clocked through the various states hereinbefore described. Accordingly, the extra cycle position on the cycle timer will cause an extra watering sequence starting at the next pulse from the watering timer 320. (Resistor 467 is for test purposes and resistor 469 is a current limiting resistor.)

It will be apparent from the foregoing explanation that the circuit of FIG. 13 may be expanded to operate additional valves in sequence by merely adding additional flip/flops and driver circuits, or that the circuit of FIG. 13 may be reduced to provide a single valve controller by eliminating flip/flops 430 and 432 and the associated driver circuits and merely coupling the output on line 446 back to the reset input for flip/flop 426.

It should be noted that in the embodiment hereinbefore described, the watering time ranges from approximately 42 seconds to 24 hours, with most increments being a factor of two from the adjacent increments. However, there is a substantial jump from 1½ minutes to 11 minutes, a consequence of the specific outputs of the 4020 flip/flop chain. This combination is utilized in the preferred embodiment, however, because watering times up to twenty-four hours are sometimes desired in agricultural and commercial applications. Another embodiment for home sprinkler systems eliminates some of the switch positions, thereby providing a maximum watering time of 1½ hours. As a further alternate, however, a 4040 may be used in place of the 4020, in combination with a lower frequency crystal to provide uniform binary jumps throughout the selected range. However, it is important to note that other watering increments, such as the three minute and six minute increments, not appearing on the watering timer, may be obtained with the embodiment disclosed. In particular, it will be noted from FIG. 13 that an ON signal is achieved on terminal 202a at the initiation of a watering cycle, and after each selected time increment thereafter one ON signal and one OFF signal is generated by the circuit, terminating finally in one OFF signal on terminal 210e. Accordingly, by way of specific example, assume the circuit of FIG. 13 were desired to be used with two valves to be operated in sequence, with each valve being ON for three minutes. This may very easily be achieved by connecting the ON terminal 202 of the first valve to the ON signal 202a of FIG. 13 and the OFF terminal 210 of the first valve to the OFF terminal 210b (rather than the OFF terminal 210a) and setting the selector to 1½ minutes. Accordingly, the first valve will turn on immediately, but will only turn off after the equivalent of two 1½ minutes watering periods, or the desired three minutes. Similarly, the second valve will operate in sequence for three minutes by using terminals 202c and 210d. Such an interconnection, even for the valve on which the electronics is mounted, may readily be achieved by a suitable spacer connector which brings out the OFF terminal 210 for connection as desired to the additional OFF terminals around the periphery of the control electronics.

Further, if desired, overlapping and staggering of the operation of the valves may be achieved, again even utilizing watering times not available on the watering timer. By way of specific example, assume the watering timer is set on 1½ minutes. If the first valve is turned ON by the signal on terminal 202a and turned OFF by the signal on terminal 210c, with the second valve being turned ON by the signal on terminal 202c and turned OFF by the signal on terminal 210e, each valve will operate for a period of 4½ minutes, an operating period not simply available by the watering timer. Furthermore, after three minutes of operation of the first valve, the second valve will come on, providing for simultaneous operation for 1½ minutes before the first valve shuts off, which might be desired in certain situations to provide some operation of a sprinkler system at reduced pressure due to the increased flow. Other examples utilizing some pause between the operation of two or more valve, or unequal watering times, will also become apparent from the foregoing explanation. To achieve any of these results on a valve other than the one on which the controller is mounted, a split connector 800 may be used as shown in FIG. 17, so that separate connections for the ON and OFF signals at the controller are possible. For the valve under the controller, a space plate under the controller is used so as to couple out the OFF signal for separate connection as desired to any of the other OFF signals.

Now referring to FIGS. 1, 1a, and particularly FIG. 13, an additional highly advantageous feature of the present invention may be seen. That feature is the moisture probe 29 and the associated circuitry in the control electronics 25. In particular, the probe 29 as illustrated in FIG. 1A is simply a device for providing first and second electrodes substantially at ground level (or penetrating the ground). In the particular embodiment of probe shown in the FIGURES, a simple plastic member having a cup-like top region 700 and a three lobed downward protruding spike 702 is provided. A central cavity 704 is also provided which is vented to the surrounding earth between the lobes in the downward protruding spike 702. A pair of pins 702 are integrally molded into the probe so as to receive a simple connector 708 having the same female connectors 710 hereinbefore described with respect to the electronics and the valves. Basically, when the ground is wet, the resistance between the two connectors 710 will be relatively low as a result of the water standing in the cup region 700, whereas when the ground is merely slightly damp or dry there will be a substantially open circuit between the connectors 710, and thus between the two probe leads identified in FIG. 13 as leads 712 and 714. (Both leads 712 and 714 connected to the lower outer edge of the control package are of the same type of connector as previously identified.) If desired, depending upon the type of control sought, earth, sand or other moisture absorbing materials may be disposed in the cup 700 to make the probe more sensitive to small amounts of moisture in the ground, or direct ground penetrating probes may be used.

The operation of the probe may be easily understood with reference to FIG. 13 and the description relating thereto. In particular, it was previously pointed out that the basic initializing signal allowing the sequential operation of the valves is received on line 322 from the cycle timer selection switch. Normally without the moisture probe this signal is coupled to capacitor 424 and resistor 422 to activate NOR gate 412. However, when the resistance between leads 712 and 714 drops to a predetermined value, indicating conductivity between the two probe terminals (connectors 710) caused by moisture on the probe, the load created on line 712 will alternate the input to NOR gate 412 below the threshold value of the gate. Thus, flip/flop 426 will not be initiated and the count down chain 410 will not be reset. In effect resistor 422 and the resistance of the probe act as a moisture sensitive variable voltage divider, which if selected in conjunction with the threshold of the NOR gate 412 will achieve the desired result at the desired moisture levels. In the preferred embodiment suitable results are achieved with resistor 422 having a resistance of approximately 4.7K ohms. The net effect of this arrangement is that the sprinkler system is substantially totally automatic, coming on at predetermined intervals for predetermined times, except during rainy periods when no watering is desired. Also it should be noted that the moisture probe does not require any significant power or additional circuitry, as its effect is only to attenuate a very short pulse, if and when called upon to do so.

Now referring to FIGS. 15 and 16, still further features which may be achieved in the present invention may be seen. In particular, in certain situations it may be desired to water during the hours of darkness on some predetermined schedule, but to not continue the watering schedule into the daylight hours. Thus, as shown in FIG. 15, a simple photoconductor 716 may be coupled between the two leads 712 and 714. During periods of darkness the resistance of the photoconductor 716 is very high, thereby not interfering with the operation of the system, which may include the moisture probe if desired. However, during daylight hours the resistance of the photoconductors 716 drops grossly so as to disable the electronics in much the same way as hereinbefore described with respect to the moisture probe.

In FIG. 16 a simple modification is shown which allows operation during the daylight hours but disables the system at night. In particular, a photovoltaic device 718 is used to charge a capacitor 720 in accordance with the intensity of the light being received. Normally the voltages on lines 712 and 714 are equal (both being +4.5 volts) so that diode 722 is back biased and decouples the voltage across capacitor 720 from the lines 712 and 714. When an initiating pulse is received, however, the voltage on line 322 swings towards ground, thereby encouraging voltage on line 712 to drop. This voltage may drop by an amount determined by the forward conduction voltage drop of diode 722 and the voltage on capacitor 720. Since the forward conduction voltage drop on diode 722 is less than the threshold voltage of NOR gate 412, the circuit will not operate unless there is a substantial voltage across capacitor 720 (assuming capacitor 720 is substantially larger than the coupling capacitor 424 of FIG. 13).

Thus during daylight hours circuit operation is enabled by the fact that the photovoltaic device will receive solar energy and charge capacitor 720 accordingly, so that the voltage across the capacitor 720 in combination with the forward conduction voltage drop of the diode will exceed the threshold voltage of the gate 412. However, the circuit will be disabled at night because the capacitor 720 will have zero or near zero voltage thereon. Again, as with respect to FIG. 15, this light sensitive circuit has no substantial effect on the operation of the moisture probe during periods when the circuit is enabled, thereby allowing the use of the moisture probe in conjunction therewith. (Suitable photoconductors and photovoltaic devices are well known in the prior art and may be readily selected by one skilled in the art to achieve the desired results. Also it should be noted that the circuits of FIGS. 15 and 16 are exemplary circuits only, illustrating the great flexibility of the electronics design and the various unusual functions which may be achieved with the present invention without requiring any substantial power from the batteries, achieved simply by the use of a pulse rather than a continuous drive on the related sensors.)

Now referring to FIG. 14, a block diagram of an alternate form of electronic control may be seen. In this system a photodiode 500 is back biased by the 4½ volt supply through a resistor 502. When the light intensity received by the photodiode increases on sunrise to a predetermined trigger level, the voltage at junction 504 rises to the trigger voltage of a Schmidt trigger 506 to turn on an oscillator 508 and provide a pulse to the RC network comprising capacitor 510 and resistor 512 to start the counter 514. It will be noted that the pulse appearing on line 516 through capacitor 510 and resistor 512 is a pulse similar to the enabling pulse from NOR gate 412 in FIG. 13, whereas the pulse train received from oscillator 508 on line 518 is equivalent to the watering timer pulses received from NOR gate 414. Accordingly, the counter 514 of FIG. 14 may be substantially identical to the flip/flop chain comprised of flip/flops 426, 428, 430 and 432 of FIG. 13, with the amplifiers and drivers 520 of FIG. 14 being comprised of the amplifiers 438 and Darlingtons 440, and associated circuitry of FIG. 13. Accordingly, the photodiode, Schmidt trigger and oscillator of FIG. 14 replace the crystal oscillator and count down chains of FIG. 13, and provide one watering cycle each morning. By using a CMOS Schmidt trigger and a high impedance photodiode network, the current drain may be maintained at a level consistent with long battery life. Also, by providing an adjustable shroud over the photodiode 500, the effects of nearby lights may be minimized, and the extent of sunlight required to operate the circuit may be varied so that the operation of two or more such devices may be suitably staggered in time, e.g., caused to occur at different times during sunrise. The watering duration may be made variable by providing a variable oscillator for oscillator 508, and additional watering cycles may be initiated manually during the day by blocking the light from photodiode 500 for a short period, dependent upon the RC time constant of resistor 502 and capacitor 522. (Capacitor 522 prevents the operation of the circuit on a momentary blockage of the light, and the hysteresis of Schmidt trigger 506 avoids multiple initiation of the circuit caused by fluctuations in the light around the threshold level). Of course simple inversion of the input or output of the Schmidt trigger would result in operation of the system on sunset rather than sunrise.

There has been described herein a new and unique pilot controlled valve which is very simple to manufacture and assemble, which provides very high reliability and long life operation, and which may utilize a solenoid actuator isolated from the fluid regions of the valve to provide operation at very low power levels. While other forms of actuation of the pilot valves may be utilized, the preferred embodiment utilizes a solenoid actuator, and more preferably a simple magnetically latching solenoid actuator operative on simple turn ON and turn OFF pulses. In the preferred embodiment substantially all of the major functional parts of a valve are simply stacked in the valve housing without regard to angular orientation, and retained in functional disposition by a simple cover retained on the housing by self tapping screw. All plastic parts may be molded without requiring secondary operations, and the actuator parts may be made by powder metallurgy techniques.

The control electronics is preferably operated by a crystal oscillator with a suitable chain of count down flip/flops to provide highly accurate timing for both the watering frequency and the watering times, utilizing selections of various outputs of the count down chain. By providing discrete ON signals and OFF signals, various combinations of operating cycles may be achieved, even obtaining watering times not available from the count down flip/flops. By coupling one of the initiating pulses to a moisture probe, operation may be disabled during rainy spells automatically. Alternate embodiments have also been disclosed which initiate on sunrise or sunset, or which disable on sunlight or darkness, all of which alternate embodiments may also utilize the moisture probe if desired. While only one specific embodiment of the pilot controlled valve has been described in detail herein, other embodiments of the valve may also be built for stand alone use, or use in other systems. By way of specific example, a simple AC solenoid may be incorporated so that the valves may operate utilizing a prior art mechanical time clock system. As a further alternate, mechanical operation of the pilot valve actuating member may be utilized still retaining the basic coaxial arrangement of the primary pilot valve parts so as to achieve a simple mechanical pushbutton valve. Thus while certain specific embodiments of the present invention have been disclosed and described in detail herein, it will be obvious to those skilled in the art that various changes in form and detail may be made therein without departing from the spirit and scope of the invention.

We claim:

1. A valve comprising:
   a housing means having a lower housing for coupling to a valve body, and an upper housing,
   a valve actuating means slideably extending into said lower portion of said valve body for motion between upper and lower positions and for defining a flow passage from said upper housing downward between said lower housing and said valve actuating means;
   a valve closure means coupled to the lower portions of said valve actuating means for engaging a valve seat on a valve body when said valve actuating means is in said lower position;
   a diaphragm within said upper housing coupled to said valve actuating means;
   a diaphragm support member in said upper housing and supporting the outer periphery of said diaphragm, said diaphragm support member and said upper housing cooperating so as to allow fluid flow therebetween;
   a pilot valve seat member above said diaphragm and mating with the diaphragm adjacent its periphery to define a fluid chamber therebetween, said pilot valve seat member having a pilot valve seat surrounding an opening therethrough;
   a separator member above said pilot valve seat member, including means for sealing said pilot valve seat member with respect to said upper housing, said separator member having an opening therethrough concentric with said pilot valve seat;
   a flexible member under said separator member to seal said opening therethrough, said flexible member being deflectable between a position against said pilot valve seat and a position spaced away from said pilot valve seat, said separator member and said pilot valve seat member having facingly disposed cooperative surfaces to define a flow passage therebetween; and
   a pilot valve actuating member extending through said opening in said separator member to control the position of said flexible member.

2. The valve of claim 1 further comprised of a spacer member between said pilot valve seat member and said separator member to encourage said flexible member into sealed abutment with said separator member to seal said opening therethrough.

3. The valve of claim 1 further comprised of a solenoid actuator above said separator member having a moving member and a stationary member having a coil, said moving member being disposed so as to actuate said pilot valve actuating member.

4. The valve of claim 3 wherein said housing means, said valve actuating means, said diaphragm, said diaphragm support member, said pilot valve seat member, said separator member and said flexible member are substantially coaxial.

5. The valve of claim 4 wherein said housing means, said pilot valve actuating member and said solenoid actuator are substantially coaxial members.

6. The valve of claim 5 wherein said solenoid actuator is a magnetically latching actuator.

7. The valve of claim 6 further comprised of a cap means for sealing the top of said upper housing and retaining the parts in said upper housing in cooperative disposition.

8. The valve of claim 1 further comprising a solenoid actuator means in said housing means above and substantially concentric with said pilot valve seat member, said pilot valve actuating member being a means for controlling the position of said flexible member responsive to said solenoid actuator means.

9. The valve of claim 8 further comprised of means for enclosing the top of said housing means and for retaining all the foregoing members in cooperative disposition.

10. The valve of claim 8 wherein said solenoid actuator means is a latching solenoid comprising a stationary magnetic member, a movable magnetic member below said stationary member movable between a first position adjacent said stationary member and a second lower position spaced apart from said stationary member, a coil spring for encouraging said movable member to said second position, and a coil means for magnetizing the magnetic circuit comprised at least in part by said stationary and movable magnetic members, said pilot valve actuating member being responsive to the motion of said movable magnetic member.

11. The valve of claim 10 further comprised of means for enclosing the top of said housing means and for retaining all of the foregoing members in cooperative disposition, said means for enclosing the top of said housing including terminal means passing therethrough and coupled to said coil means for coupling solenoid drive signals thereto.

12. The valve of claim 10 wherein said stationary and said movable magnetic members are each substantially homogeneous members.

13. The valve of claim 12 wherein said magnetic members are powder metal members.

14. The valve of claim 1 wherein said lower portion of said housing means is coupled to a coupling member for coupling to a valve pilot, said coupling member having an externally threaded region for threading into a valve pilot, and an enternally threaded region for threading onto said lower portion of said housing means, whereby said housing means may be threaded into and out of said coupling member to provide a flow control for said valve.

* * * * *